United States Patent [19]

Binner

[11] 4,349,246
[45] Sep. 14, 1982

[54] REAR VIEW MIRROR WITH SLIT CLIP ATTACHMENT

[76] Inventor: Tihamer S. Binner, 304 West Point Ave., Somerset, N.J. 08873

[21] Appl. No.: 207,752

[22] Filed: Nov. 17, 1980

[51] Int. Cl.³ .......................... G02B 7/18; G02C 7/14; G02C 9/04
[52] U.S. Cl. .................................... 350/298; 351/50; 24/3 C
[58] Field of Search ............... 350/298, 303, 304, 302, 350/307, 288; 248/467, 479, 481-484; 351/50; 24/3 C, 3 J, 3 L, 243 R, 252 R

[56] References Cited

U.S. PATENT DOCUMENTS

| | | | |
|---|---|---|---|
| D. 238,354 | 1/1976 | Beethoven | 351/50 |
| 2,175,896 | 10/1939 | Jiranek | 351/50 |
| 2,668,477 | 2/1954 | Shaikun | 248/467 |
| 2,880,651 | 4/1959 | Fenyo | 248/467 |
| 2,968,995 | 1/1961 | Holden | 248/467 |
| 3,988,058 | 10/1976 | Chaney et al. | 350/298 |
| 4,105,183 | 8/1978 | Clark | 350/298 |

FOREIGN PATENT DOCUMENTS

| | | | |
|---|---|---|---|
| 594364 | 6/1959 | Italy | 351/50 |
| 1199851 | 7/1970 | United Kingdom | 248/467 |

*Primary Examiner*—Jon W. Henry
*Attorney, Agent, or Firm*—Richard L. Miller

[57] ABSTRACT

A rear view mirror for being personally worn by a user; the mirror including a clip for attachment either to the person's eyeglasses, hat, helmet, shoulder or the like, and a universal joint between the mirror and clip, for directionally aligning the mirror.

1 Claim, 8 Drawing Figures

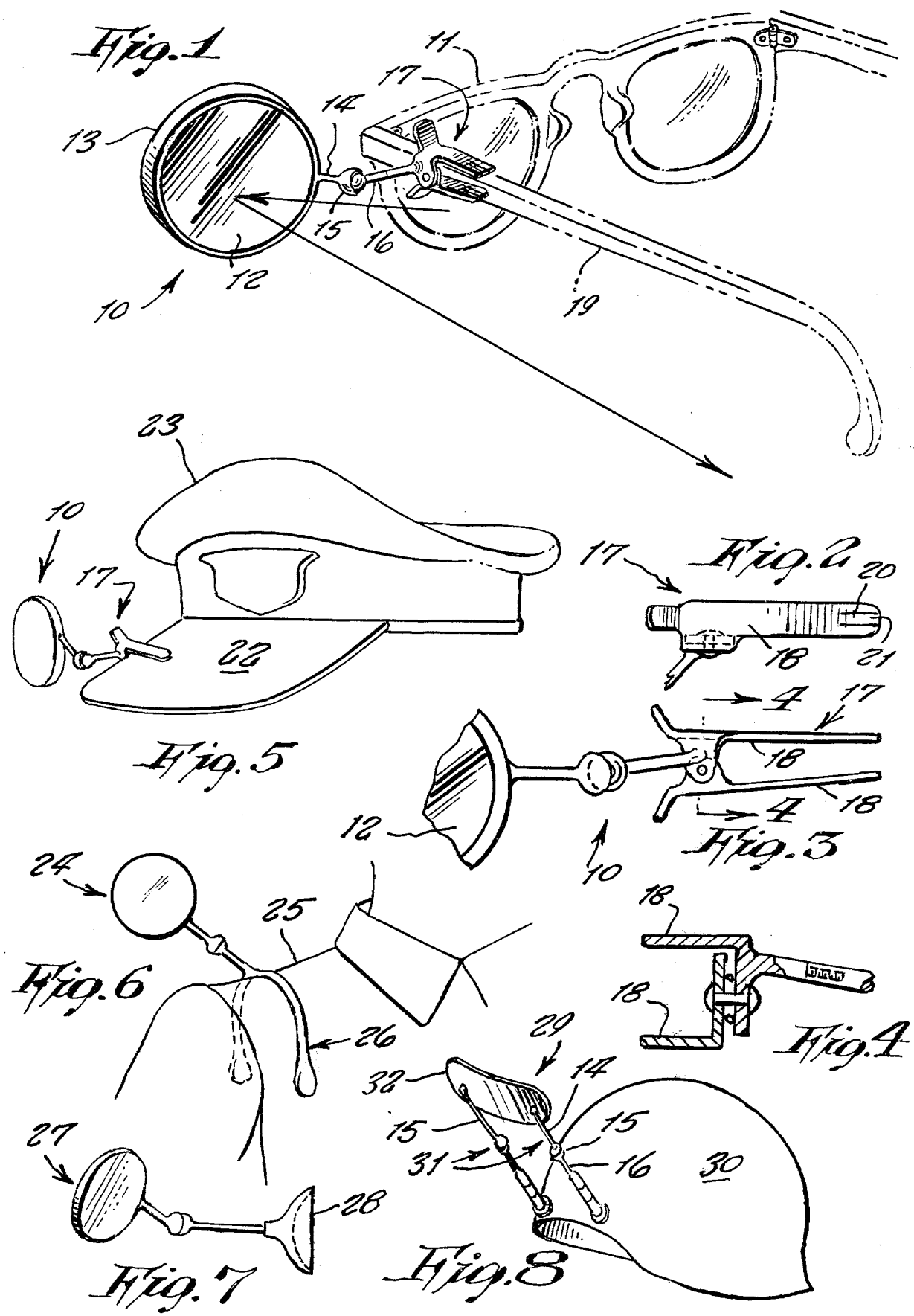

REAR VIEW MIRROR WITH SLIT CLIP ATTACHMENT

BACKGROUND OF THE INVENTION

It is well known that at times a person must see rearwardly for personal safety against assault or other danger, or for just other useful purposes, and it may be either not convenient or easy to continually keep turning ones head fully rearwardly, so that such rearward viewing is not adaquately efficient. This situation is accordingly in need of an improvement.

SUMMARY OF THE INVENTION

Accordingly, it is a principal object of the present invention, to provide a rear view mirror that can be worn by a person so that at all times, the person can see rearwardly, without need of tiring himself by a continued turning of his head.

Another object, more specifically, is to provide a rear view mirror which would be ideal for use by persons walking alongside a country road so as to be safe from approaching vehicles behind him; policemen or other guards who may be subject to an assult from behind, and the like.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows:

FIG. 1 is a perspective view of the invention attached to a pair of eye glasses.

FIG. 2 is a top view of the invention clamp.

FIG. 3 is a side view thereof.

FIG. 4 is an enlarged cross section on line 4—4 of FIG. 3.

FIG. 5 shows the invention clamped to a policeman's cap.

FIG. 6 shows it screw attached to a shoulder clamp which comprises an alternate attachment.

FIG. 7 shows it connected to a suction cup attachment for placement upon a suitable surface.

FIG. 8 shows a modified design of the invention attached to a helmet.

DETAILED DESCRIPTION OF THE PREFERRED EMBODIMENT

Referring now to the drawing in greater detail, and more particularly to FIGS. 1 through 4 thereof, at this time, the reference numeral 10 represents a rear view mirror, for personal use, according to the present invention, wherein the same is designed for being supported from a pair of eye glasses 11 or the like, and which includes a mirror 12 fitted in a frame 13. A sideward stem 14 rigidly affixed to a side edge of the frame. An outer end of the stem is connected by means of a universal ball-and-socket joint 15 to an end of a stem 16 affixed to a side of a clip 17 having spring-loaded tongues 18 for being clamped around upper and lower sides of an eye glasses temple bar 19. Each tongue is slitted on its end with slits 20 so as to form fingers 21 that grasp more efficiently around cylindrical surfaces such as when a temple bar is rounded.

In operative use, as shown in FIG. 1, by adjusting the mirror position at the ball-and-socket joint, the eye glasses wearer can comfortably see rearwardly as well as forwardly at the same time while not turning a head.

FIG. 5 illustrates the above described rear view mirror clipped to a peak 22 of a cap 23 of a policeman or other guard.

FIG. 6 illustrates another design of rear view mirror 24 which can be supported upon a wearer's shoulder 25, and which is generally the same as rear view mirror 10 except that the above-described clip 17 is substituted by a wide clamp 26 designed to fit the shoulder.

In FIG. 7, a rear view mirror 27 is also the same as rear view mirror 10 except that the clip 17 is substituted by a suction cup 28 for support from any stiff or hard, smooth surface carried by a person, such as a head phone or other object carried on a head.

In FIG. 8, another design of rear view mirror 29 is mountable on a military helmet 30 by means of a pair of arms 31 for greater securement. Each arm includes the above-described ball-and-socket joint 15 and stems 14 and 16. The mirror 32 is curved so to be of wide view type, as shown.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A rear view mirror for personal use, comprising in combination, a mirror in a frame, an arm affixed to said frame, a pivotable stem on an end of said arm and a support means on an end of said stem for support from a garment or other object such as eyeglasses or the like being worn by a person; a ball and socket joint between said arm and said stem for adjustment of said mirror; said mirror being of wide view type; and said support means on an end of said stem comprising a clip having a pair of spring-loaded tongues for being clasped around upper and lower sides of an eyeglasses temple bar or the like; each said tongue being slit on its end with slits so as to form fingers for grasp around cylindrically rounded surfaces.

* * * * *